United States Patent
Tsukuda et al.

(10) Patent No.: US 11,932,082 B2
(45) Date of Patent: Mar. 19, 2024

(54) VEHICLE AIR CONDITIONER

(71) Applicant: MARELLI CABIN COMFORT JAPAN CORPORATION, Saitama (JP)

(72) Inventors: Ryuuji Tsukuda, Saitama (JP); Tsugutaka Ishikawa, Saitama (JP); Kazuyuki Maruyama, Saitama (JP); Ichiro Miyata, Shelbyville, TN (US)

(73) Assignee: Marelli Cabin Comfort Japan Corporation, Saitama (JP)

( * ) Notice: Subject to any disclaimer, the term of this patent is extended or adjusted under 35 U.S.C. 154(b) by 250 days.

(21) Appl. No.: 17/055,708

(22) PCT Filed: Mar. 25, 2019

(86) PCT No.: PCT/JP2019/012512
§ 371 (c)(1),
(2) Date: Nov. 16, 2020

(87) PCT Pub. No.: WO2019/220777
PCT Pub. Date: Nov. 21, 2019

(65) Prior Publication Data
US 2021/0206231 A1    Jul. 8, 2021

(30) Foreign Application Priority Data

May 17, 2018  (JP) ................................. 2018-095357
Mar. 25, 2019  (JP) ................................. 2019-056611

(51) Int. Cl.
*B60H 1/00* (2006.01)

(52) U.S. Cl.
CPC ..... *B60H 1/00849* (2013.01); *B60H 1/00028* (2013.01); *B60H 2001/00085* (2013.01)

(58) Field of Classification Search
CPC ............ B60H 1/00471; B60H 1/00028; B60H 1/00521; B60H 2001/00085
USPC .................................................... 454/69–165
See application file for complete search history.

(56) References Cited

U.S. PATENT DOCUMENTS

| | | | |
|---|---|---|---|
| 2002/0025772 A1 | 2/2002 | Egami et al. | |
| 2002/0117296 A1* | 8/2002 | Smith ................ | B60H 1/00028 165/42 |
| 2003/0121640 A1* | 7/2003 | Currle ................... | F04D 17/161 165/119 |
| 2004/0069480 A1* | 4/2004 | Yamamoto ......... | B60H 1/00528 165/76 |
| 2008/0229721 A1* | 9/2008 | Richter ............... | F04D 29/4226 55/385.3 |

(Continued)

FOREIGN PATENT DOCUMENTS

| | | |
|---|---|---|
| CN | 1677019 A | 10/2005 |
| CN | 103121391 A | 5/2013 |

(Continued)

*Primary Examiner* — Ko-Wei Lin
(74) *Attorney, Agent, or Firm* — Foley & Lardner LLP

(57) ABSTRACT

A present disclosure relates to a vehicle air conditioner including a blower. At least the blower is disposed within an engine compartment. The blower includes a motor that is configured to rotate a fan. A rotating shaft of the motor is diagonally arranged with an inclination angle that is greater than 0 degree and less than 90 degrees with respect to a vertical direction. An attachable/detachable direction of the motor with respect to the blower-is an upper side thereof.

7 Claims, 15 Drawing Sheets

(56) References Cited

U.S. PATENT DOCUMENTS

| | | | |
|---|---|---|---|
| 2010/0029192 A1* | 2/2010 | Hipp-Kalthoff | B60H 1/00378 454/159 |
| 2014/0335774 A1* | 11/2014 | Dorland | B60H 1/00685 454/139 |
| 2015/0226107 A1* | 8/2015 | Bang | B60K 11/08 454/106 |
| 2017/0072765 A1* | 3/2017 | Fukatsu | B60H 1/00207 |
| 2017/0203631 A1 | 7/2017 | Ryu | |
| 2019/0061469 A1* | 2/2019 | Hirata | B60H 1/00849 |

FOREIGN PATENT DOCUMENTS

| | | |
|---|---|---|
| CN | 106976375 A | 7/2017 |
| DE | 94 20 222 U1 | 4/1996 |
| EP | 1 769 952 A1 | 4/2007 |
| EP | 2 119 582 A1 | 11/2009 |
| EP | 3192682 A2 | 7/2017 |
| JP | H06-1134 A | 1/1994 |
| JP | 2002-137621 A | 5/2002 |
| JP | 2003-104036 A | 4/2003 |
| JP | 2003-326939 A | 11/2003 |
| JP | 2003326939 A * | 11/2003 |
| JP | 2005-014703 A | 1/2005 |
| JP | 2005014703 A * | 1/2005 |
| JP | 2009-280101 A | 12/2009 |
| JP | 2017-128328 A | 7/2017 |

\* cited by examiner

VEHICLE FRONT SIDE

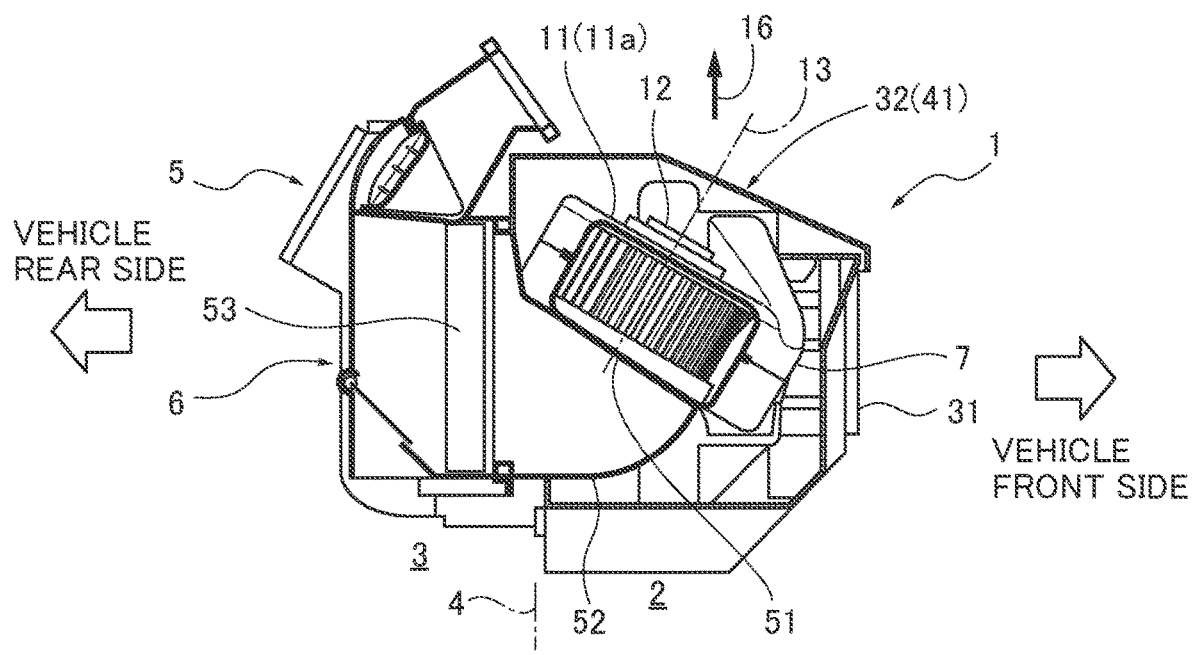

VEHICLE REAR SIDE ← → VEHICLE FRONT SIDE

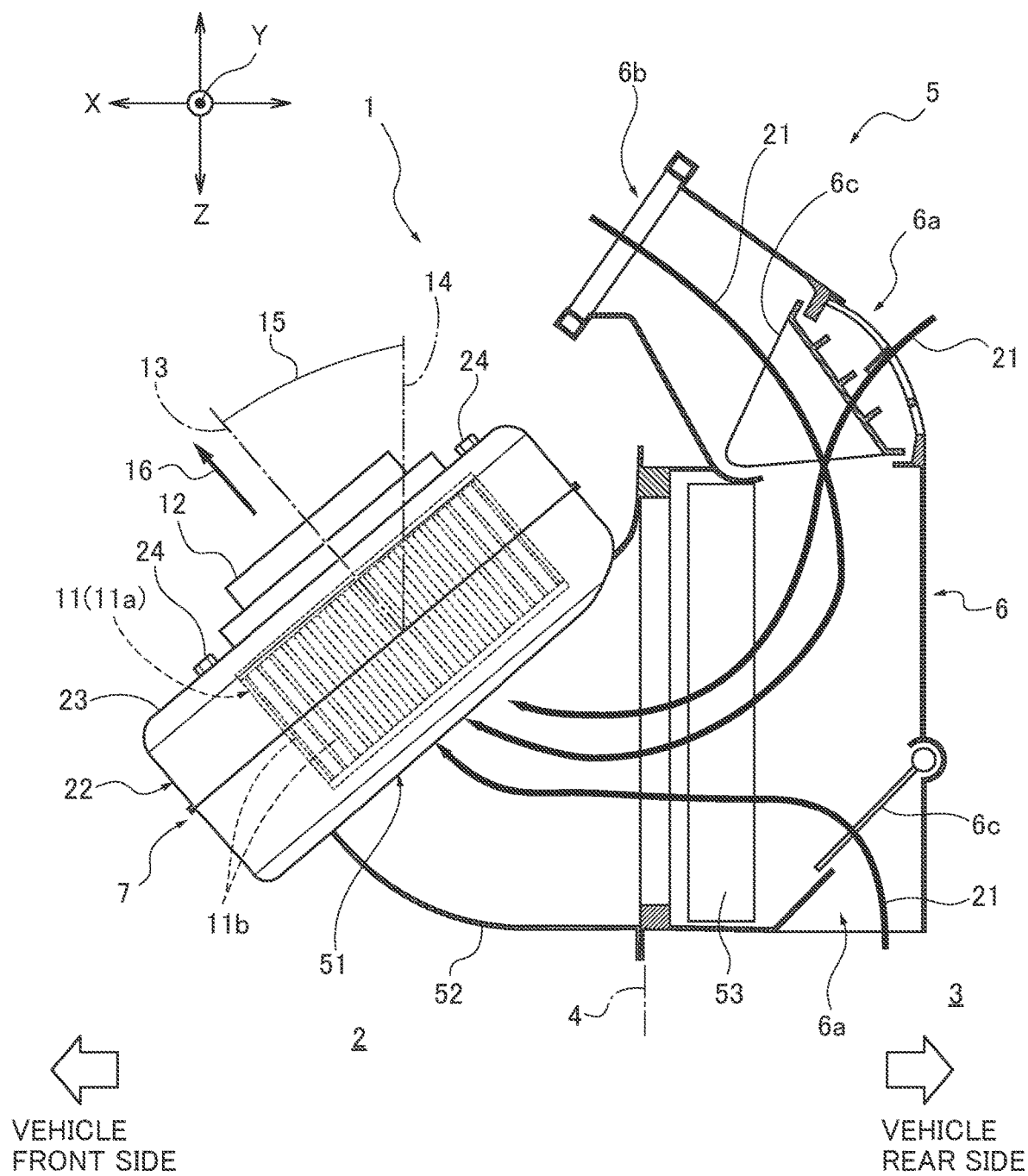

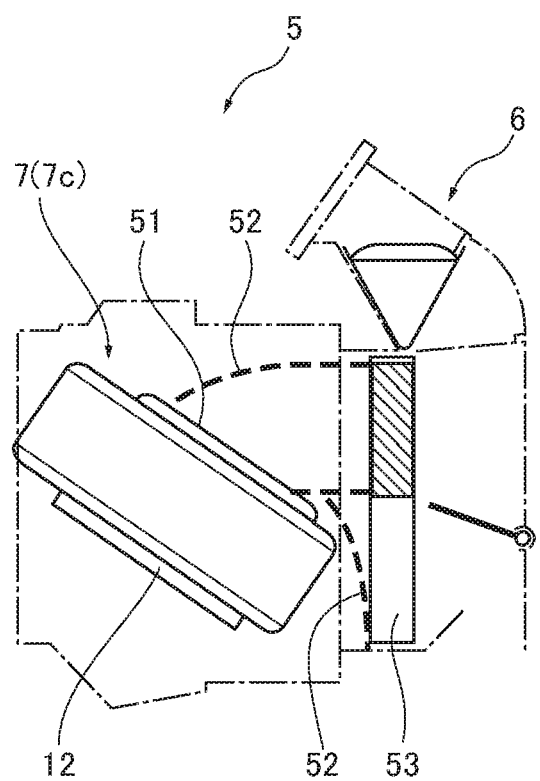

VEHICLE AIR CONDITIONER

CROSS-REFERENCE TO RELATED APPLICATION

This application is a 371 national stage application of PCT/JP2019/012512 filed on Mar. 25, 2019, which is based upon and claims the benefit of priority from Japanese Patent Application No. 2018-95357 filed to Japan Patent Office on May 17, 2018 and Japanese Patent Application No. 2019-056611 filed to Japan Patent Office on Mar. 25, 2019, the entire disclosure of all of which are incorporated herein by reference.

A present disclosure relates to a vehicle air conditioner.

BACKGROUND ART

A vehicle such as an automobile is provided with an air conditioner (vehicle air conditioner). An entire body of the air conditioner is usually disposed within a vehicle cabin or passenger compartment. In order to make the vehicle cabin more spacious, for example, it has been proposed that a part of the air conditioner body is disposed within an engine compartment to reduce the size of the portion to be disposed within the vehicle cabin (see Patent Literature I: JP 2017-128328 A1, for example).

SUMMARY

In the vehicle air conditioner disclosed in Patent Literature I, a blower is disposed within the engine compartment but the engine compartment restricts the free layout for the blower. Also, clearances between the blower and other components within the engine compartment are narrow. Thereby, it is difficult to perform maintenance for the blower from the engine compartment side and accordingly it is necessary to perform the maintenance of the blower from the vehicle cabin side instead.

In the case that the maintenance of the blower is performed from the vehicle cabin side, the blower can only be accessed after first removing an instrument panel from a vehicle body and then removing the parts of the air conditioner installed in the vehicle cabin. This requires a larger amount of work, a longer work time, and a heavier workload for the maintenance, and the like.

Accordingly, an object of the present disclosure is to solve the above issues.

In order to solve the above issues, a vehicle air conditioner of the present disclosure includes a blower. At least the blower is disposed within an engine compartment. The blower includes a motor that is configured to rotate a fan. A rotating shaft of the motor is diagonally arranged with an inclination angle that is greater than 0 degree and less than 90 degrees with respect to a vertical direction. An attachable/detachable direction of the motor with respect to the blower is an upper side thereof.

BRIEF DESCRIPTION OF DRAWINGS

FIG. 3C is a vertical cross-sectional view illustrating the vehicle air conditioner shown in FIG. 3A.

FIG. 4C is a vertical cross-sectional view illustrating the inside/outside air switching device and the blower (inclination angle: 40 degrees).

FIG. 5C illustrates a comparative example, relative to FIG. 4A, in which the blower is diagonally placed by reversing the blower of the embodiment in a vertical direction.

DETAILED DESCRIPTION

Hereinafter, an embodiment of the present disclosure will be described with reference to the drawings. FIGS. 1 to 7C illustrate the embodiment.

<Configuration> Hereinafter, an embodiment will be described.

Figure 1:
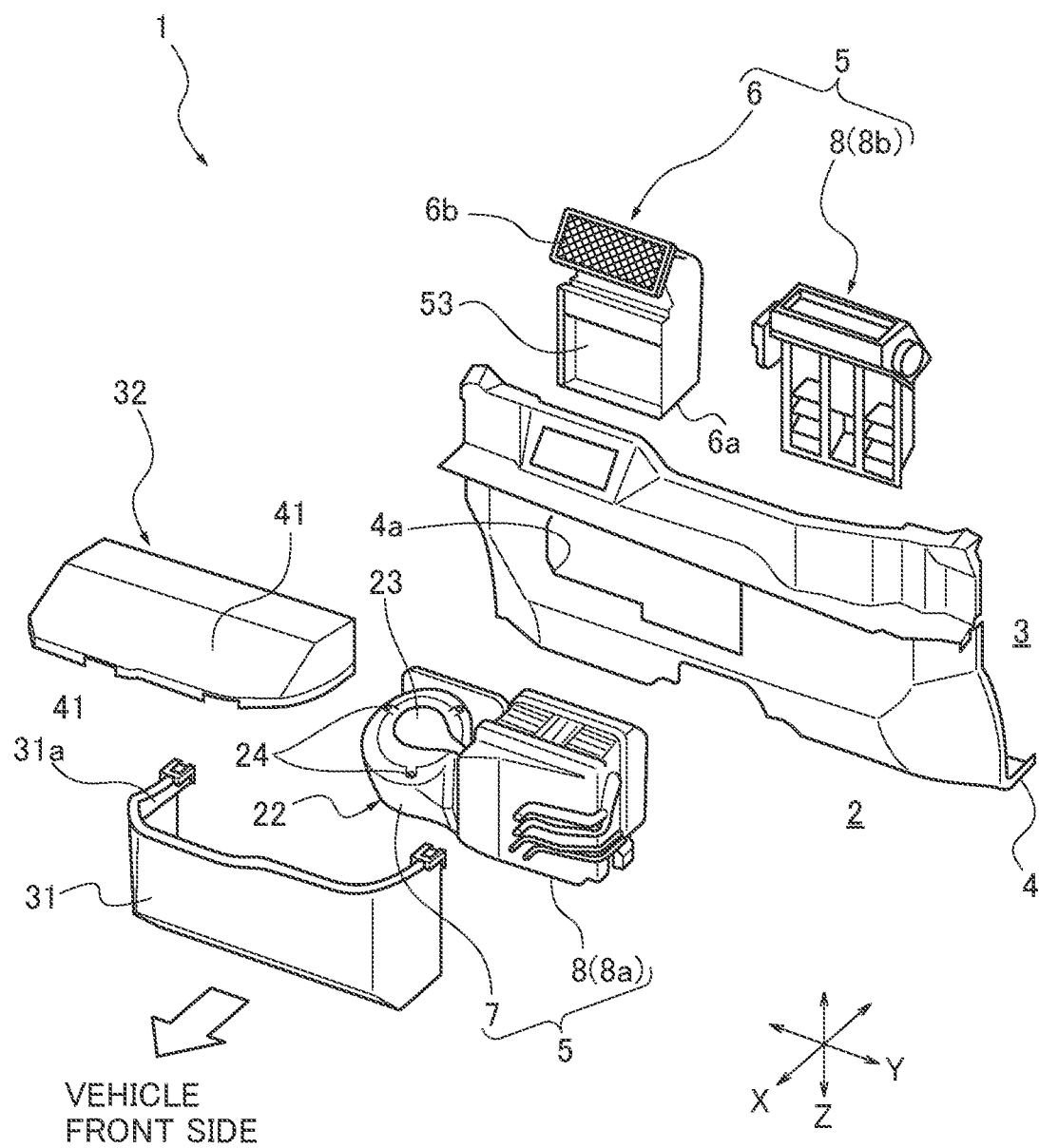
FIG. 1 is an exploded perspective view illustrating a vehicle air conditioner in an embodiment of the present disclosure which is installed in a vehicle body.
Figure 2A:
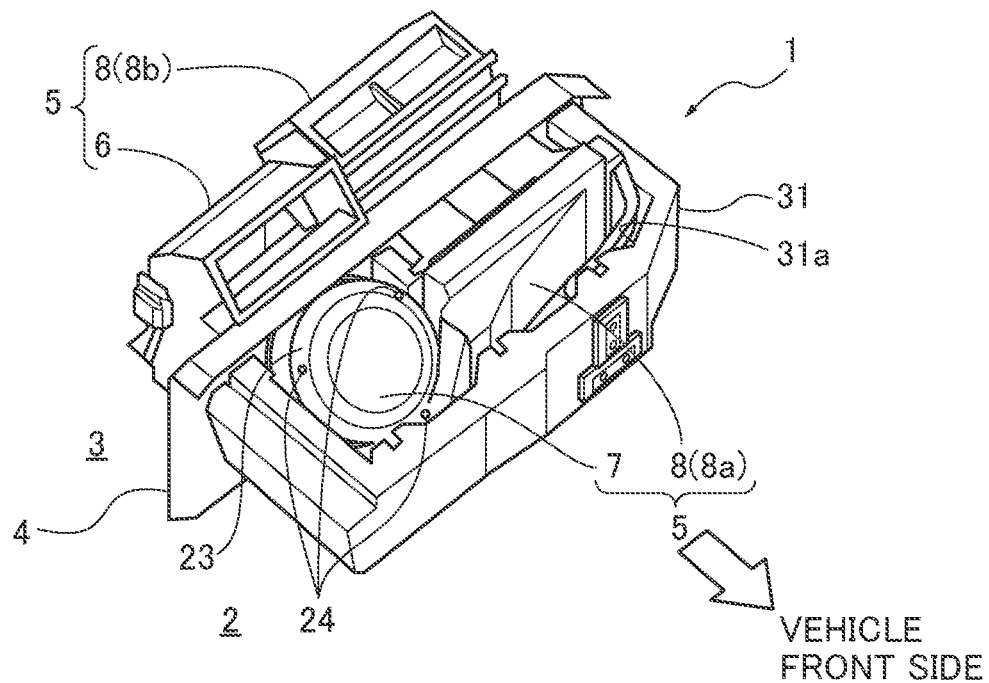
FIG. 2A is an overall perspective view illustrating the assembled vehicle air conditioner shown in FIG. 1 which is installed in the vehicle body.
Figure 2B:
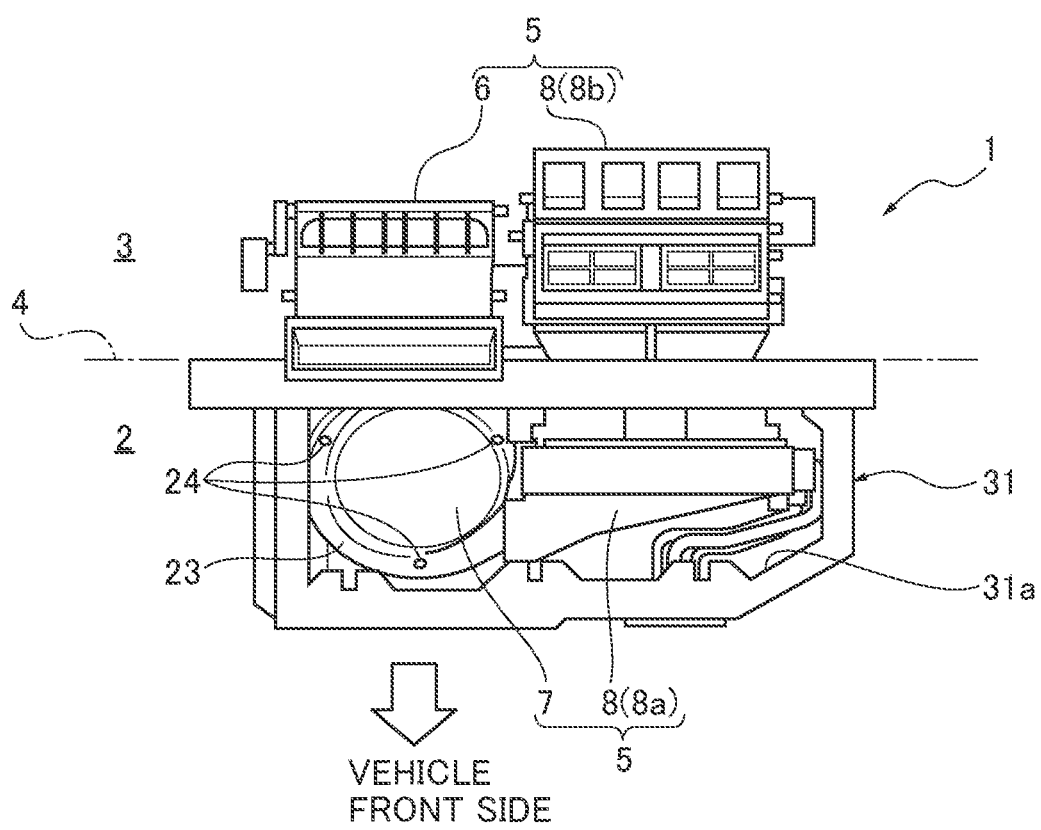
FIG. 2B is a plan view illustrating the entire vehicle air conditioner shown in FIG. 2A.
Figure 2C:
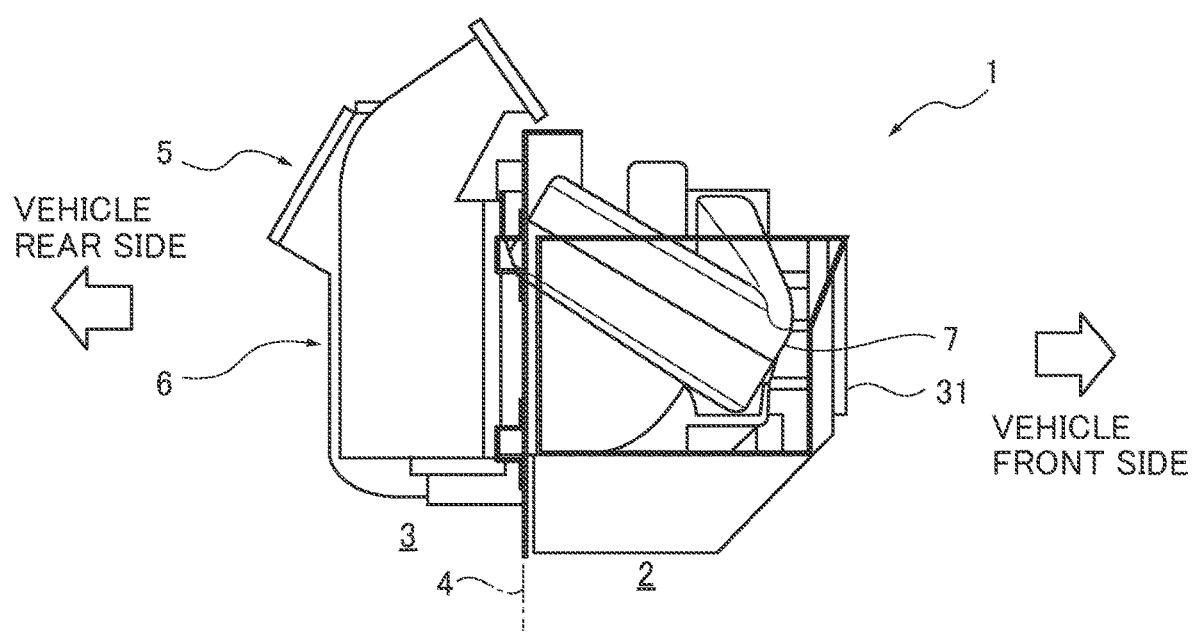
FIG. 2C is a side view illustrating the entire vehicle air conditioner shown in FIG. 2A.
Figure 3A:
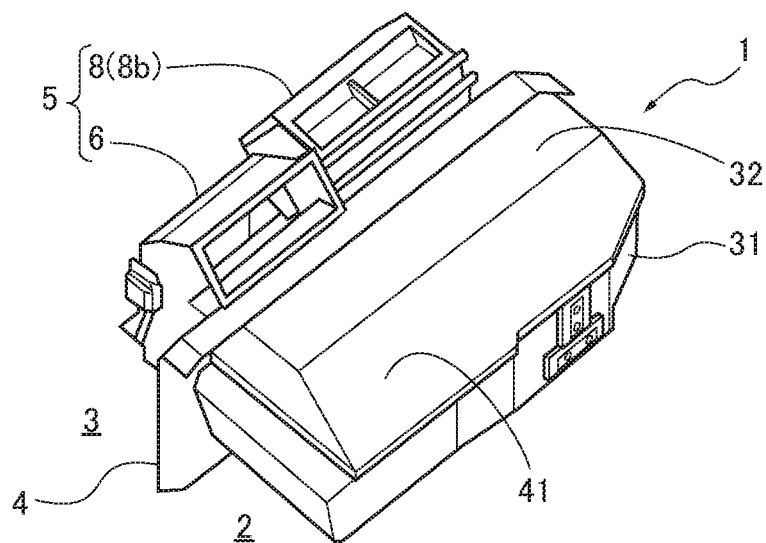
FIG. 3A is an overall perspective view illustrating a state that the vehicle air conditioner shown in FIGS. 2A and 2B is completely covered by a cover and an opening and closing portion.
Figure 3B:
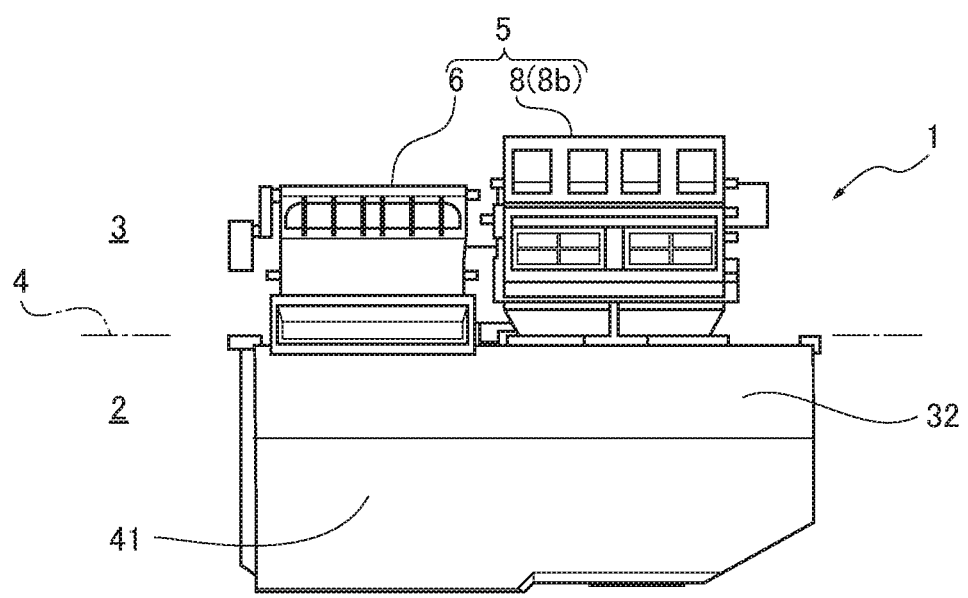
FIG. 3B is a plan view illustrating the entire vehicle air conditioner shown in FIG. 3A.

FIG. 1 (to FIG. 3C) is a perspective view illustrating a front structure of a vehicle 1 such as an automobile.

Note that directions X, Y, and Z shown in FIG. 1 are referred to as a vehicle longitudinal direction X, a vehicle width direction Y, and an up-down direction Z.

An engine compartment 2 is provided in the front part of the vehicle 1. A vehicle cabin 3 is provided in the rear of the engine compartment 2. The engine compartment 2 and the vehicle cabin 3 are partitioned by a partition wall 4 referred to as a dash panel or the like.

An air conditioner 5 (vehicle air conditioner) provided in the vehicle 1 includes an inside/outside air switching device 6, a blower 7, and an air conditioner body 8.

Note that in the general structure, the inside/outside air switching device 6, the blower 7, and the air conditioner body 8 are integrated and entirely disposed within the front part of the vehicle cabin 3 (or rear part from partition wall 4). In addition, the inside/outside air switching device 6, the blower 7, and the air conditioner body 8 are covered by the instrument panel so that passengers cannot see them.

This embodiment further includes following configurations.

Figure 4A:
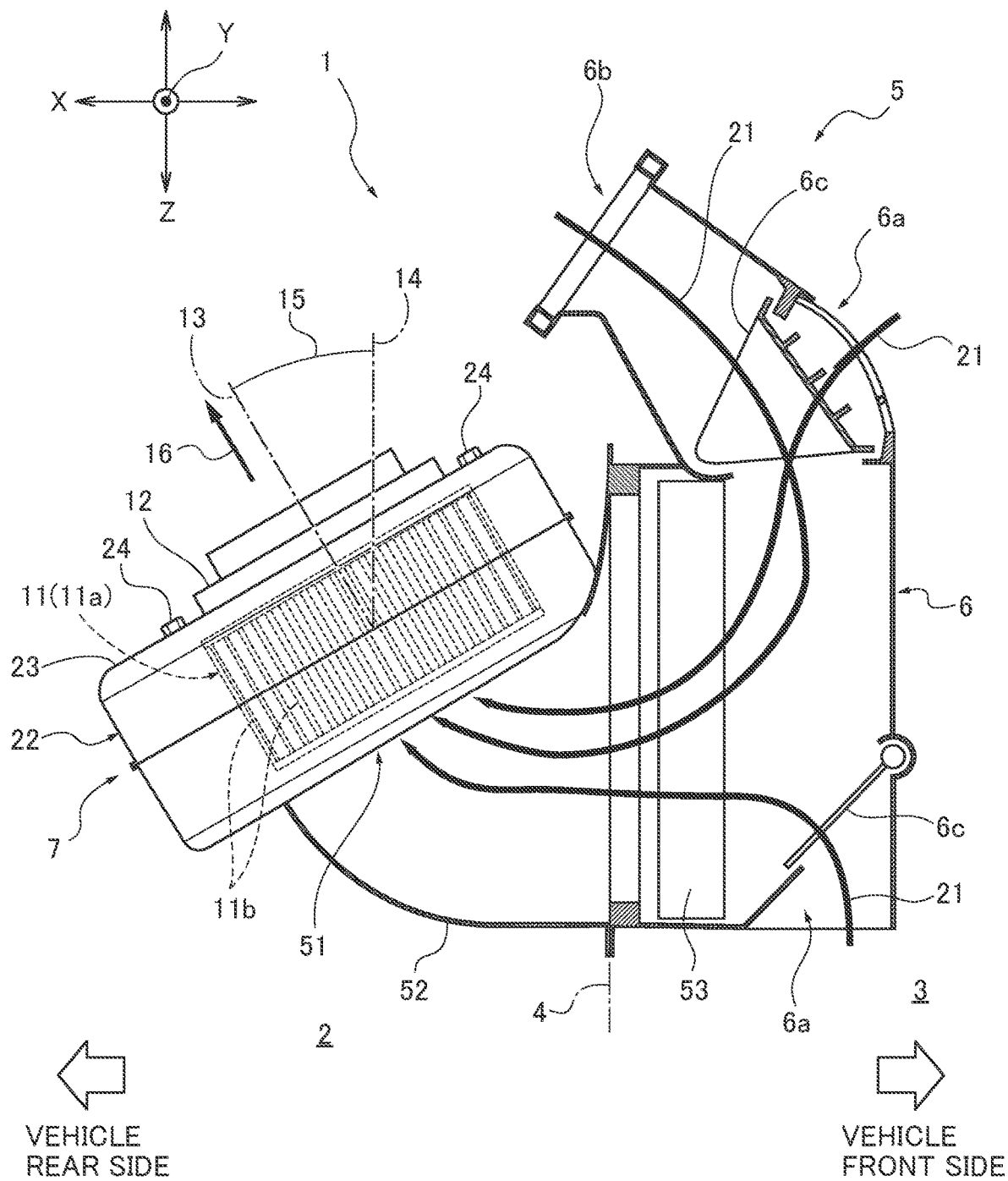
FIG. 4A is a vertical cross-sectional view illustrating an inside/outside air switching device and a blower (inclination angle: 30 degrees).

(1) At least the blower 7 is disposed within the engine compartment 2. As shown in FIG. 4A, the blower 7 includes a motor 12 that is configured to rotate a fan 11. A rotating shaft 13 of the motor 12 is diagonally arranged with an inclination angle 15 that is greater than 0 degree and less than 90 degrees with respect to a vertical direction 14. An attachable/detachable direction 16 of the motor 12 with respect to the blower 7 is an upper side thereof.

The engine compartment 2 is located in the front part of a vehicle body and includes a space to house a powertrain such as an engine and auxiliary equipment, and the like. Note that in the case of a vehicle such as an electric vehicle, a drive motor, a battery and the like are disposed within the engine compartment 2. Portions of the air conditioner 5 other than the blower 7 may be disposed within the engine compartment 2. In this embodiment, the air conditioner body 8 is divided into a front portion 8a and a rear portion 8b. The front portion 8a is disposed within the engine compartment 2. The inside/outside air switching device 6 and the rear portion 8b of the air conditioner body 8 are disposed within the vehicle cabin 3.

The air conditioner 5 is a device that is configured to adjust temperature in the vehicle cabin 3. The blower 7 is a device that is configured to take an air 21 to be conditioned into the air conditioner 5. The blower 7 has a substantially cylindrical shape. The fan 11 is an element configured to generate the flow of the air 21 inside and outside of the air conditioner 5 by the rotation. The fan 11 is connected to the rotating shaft 13 of the motor 12. The motor 12 is a rotary drive device that is configured to rotate the fan 11.

The rotating shaft 13 is a part of the motor 12 and a shaft member that is rotated by electromagnetic force. The vertical direction 14 is a direction that is coincident with the up-down direction Z when the vehicle body is placed horizontally.

Figure 5A:
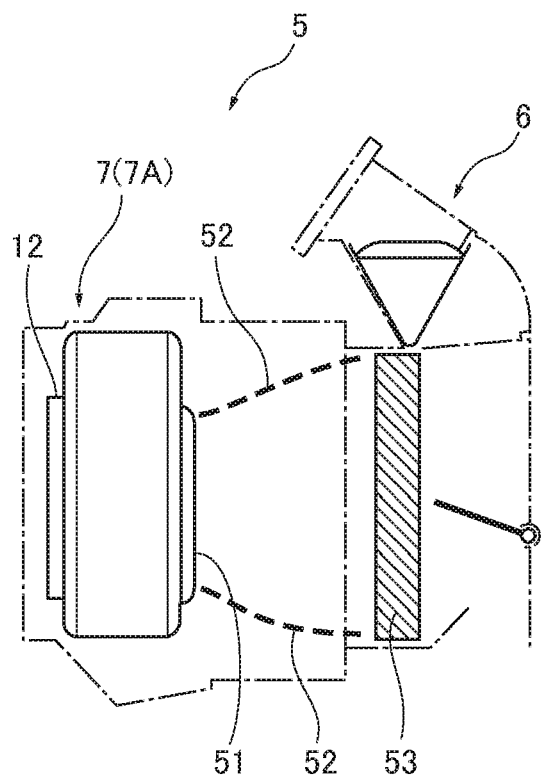
FIG. 5A is a vertical cross-sectional view illustrating a comparative example, relative to FIG. 4A, in which the blower is vertically placed (inclination angle: 90 degrees).
Figure 5B:
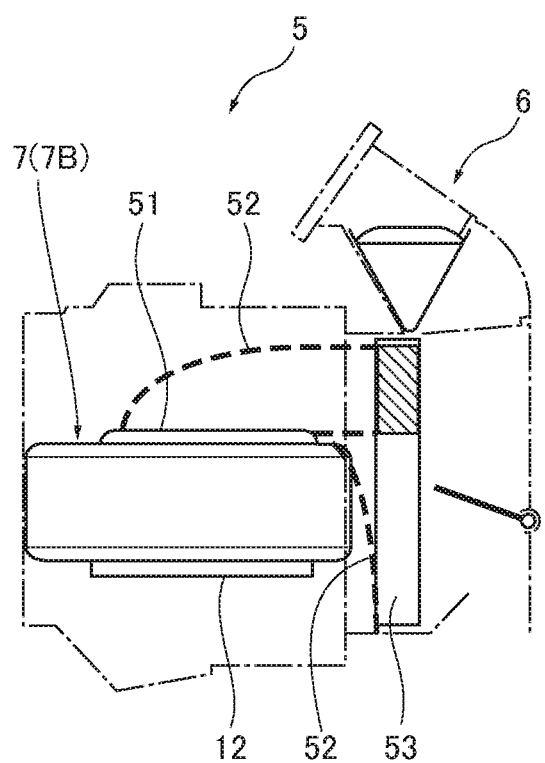
FIG. 5B illustrates a comparative example, relative to FIG. 4A, in which the blower is horizontally placed (inclination angle: 0 degree).
Figure 6A:
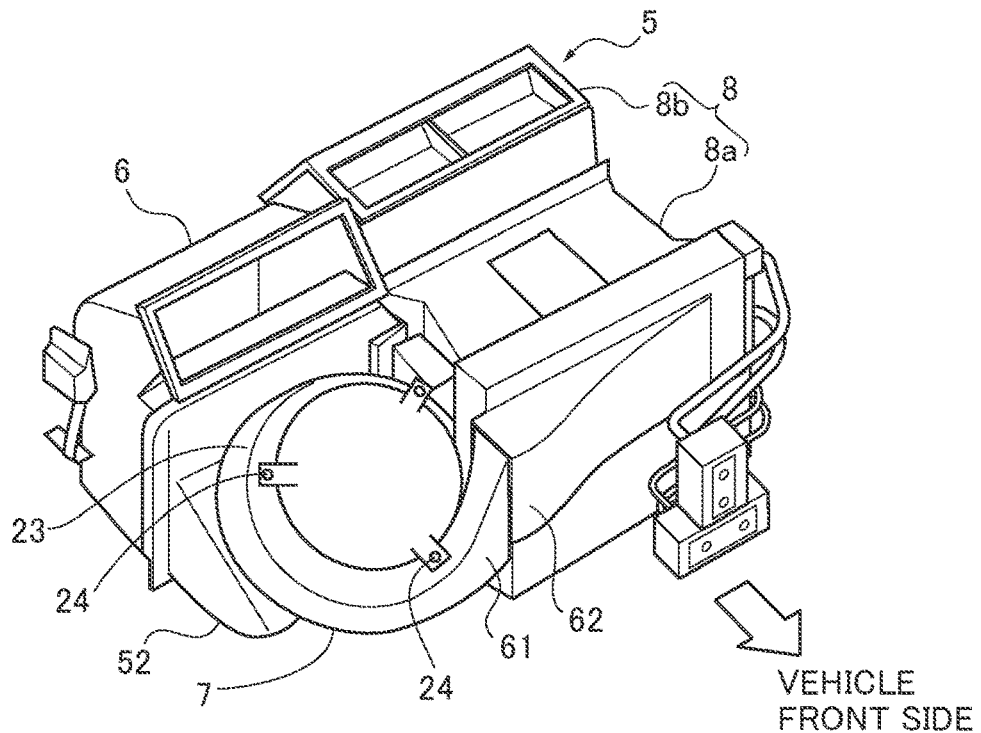
FIG. 6A is a perspective view illustrating a contact state between the blower and the air conditioner body.
Figure 6B:
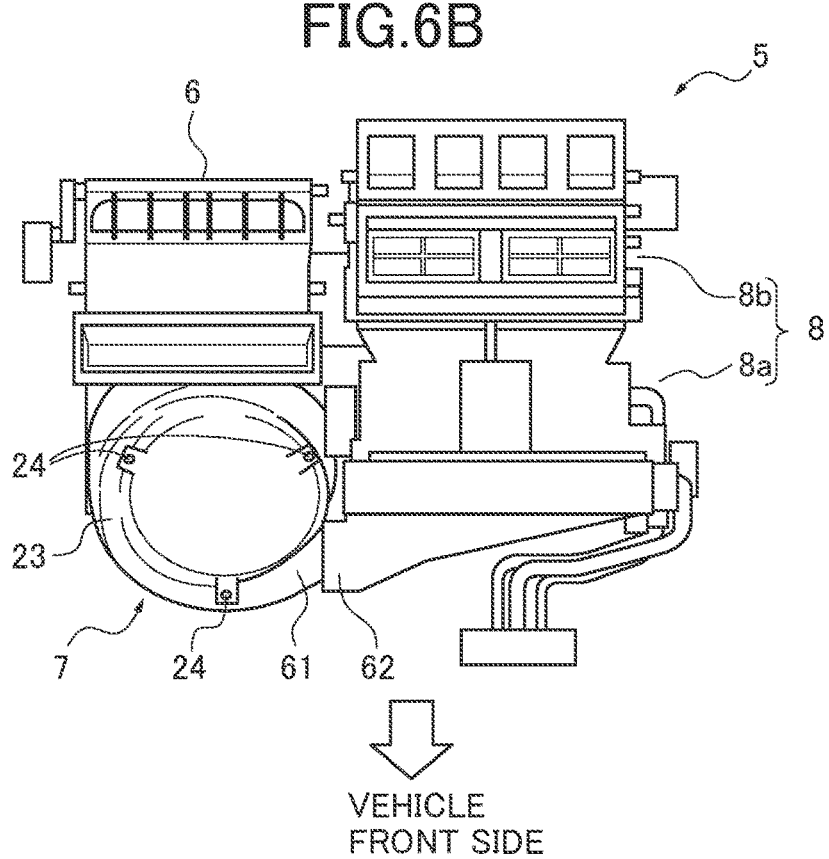
FIG. 6B is a plan view illustrating the contact state shown in FIG. 6A.
Figure 6C:
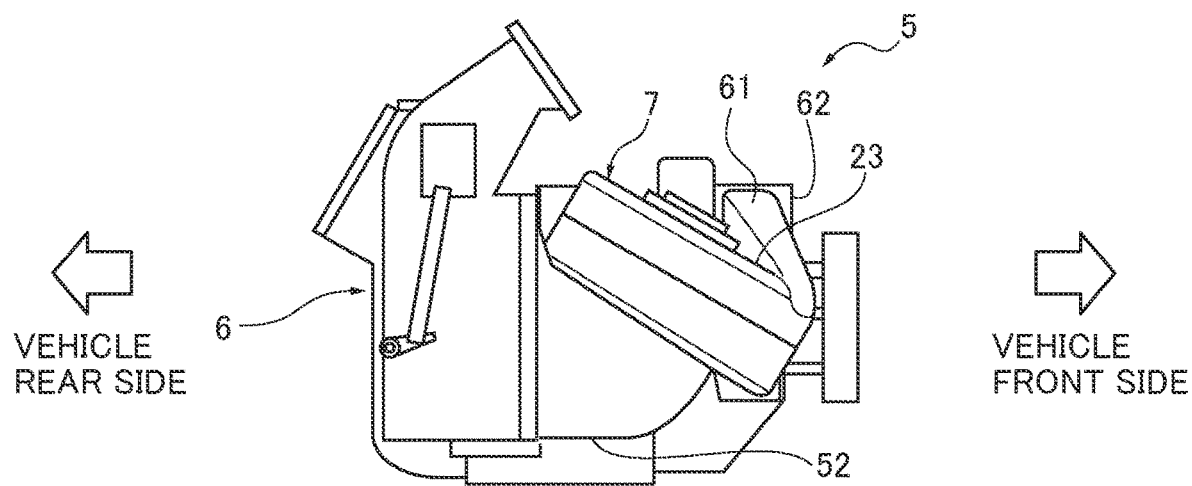
FIG. 6C is a side view illustrating the contact state shown in FIG. 6A.
Figure 6D:
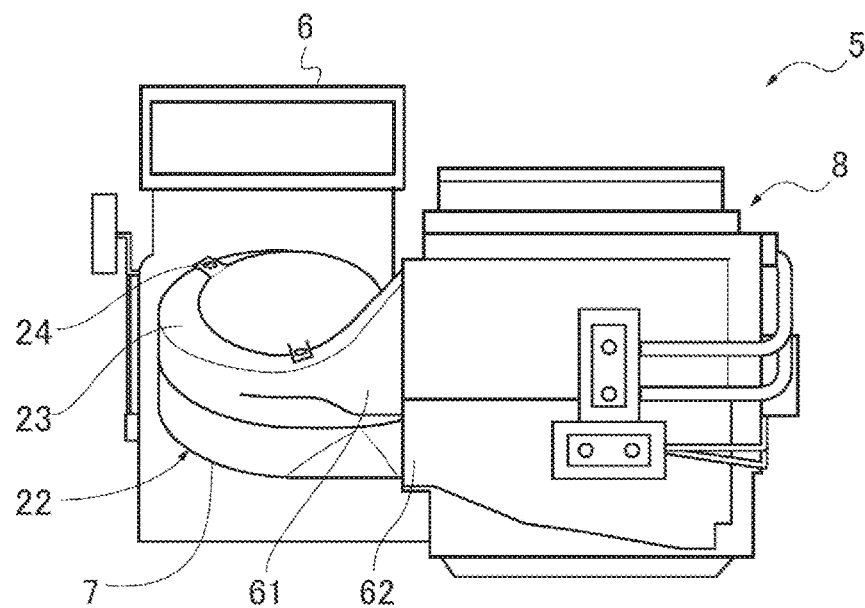
FIG. 6D is a front view illustrating the contact state shown in FIG. 6A.

The inclination angle 15 is an angle of the inclination of the rotating shaft 13 with respect to the vertical direction 14. For example, as shown in FIG. 5A, when the inclination angle 15 is set to be 90 degrees with respect to the vertical direction 14, the blower 7 (or the blower 7A) is vertically disposed (or arranged in vertical direction). On the other hand, as shown in FIG. 5B, when the inclination angle 15 is set to be 0 degree with respect to the vertical direction 14, the blower 7 (or the blower 7B) is horizontally disposed (or arranged in horizontal direction). In this embodiment, as shown in FIG. 4A, the rotating shaft 13 is inclined toward the front side of the vehicle 1. Note that the inclination of the rotating shaft 13 toward the front side of the vehicle 1 is not necessarily accurately inclined toward the front side, but the rotating shaft 13 may also be slightly inclined in the left and right direction.

The attachable/detachable direction 16 includes an attachable direction of the motor 12 to the blower 7 and a detachable direction of the motor 12 from the blower 7. In this embodiment, the attachable/detachable direction 16 is upward in the up-down direction Z, or diagonally upward substantially along an axial direction of the rotating shaft 13 in the case that the motor 12 is disposed in the upper side of a casing 22 of the blower 7.

As shown in FIG. 5C, on the other hand, the attachable/detachable direction 16 is downward in the up-down direction Z, or diagonally downward substantially along the axial direction of the rotating shaft 13 in the case that the motor 12 is disposed in the bottom side of the casing 22 of the blower 7.

Here, the casing 22 of the blower 7 has a shape to surround the fan 11 (e.g. having cylindrical shape). The upper surface of the casing 22 constitutes a mounting surface 23 for the motor 12. The mounting surface 23 includes an opening (motor opening) through which a part of the motor 12 and the fan 11 is inserted. The motor 12 includes mounting pieces that protrude toward a peripheral portion of the opening. The mounting pieces are fastened and fixed to the peripheral portion using fastening members such as bolts so that fixing points 24 are formed. A plurality of the fixing points 24 is arranged at predetermined intervals in the circumferential direction of the opening. A sealing or seal member may be provided between the motor 12 and the opening for waterproofing, sound insulation or the like, if necessary.

The upper side is located higher than an upper surface (mounting surface 23) of the blower 7.

Figure 4B:
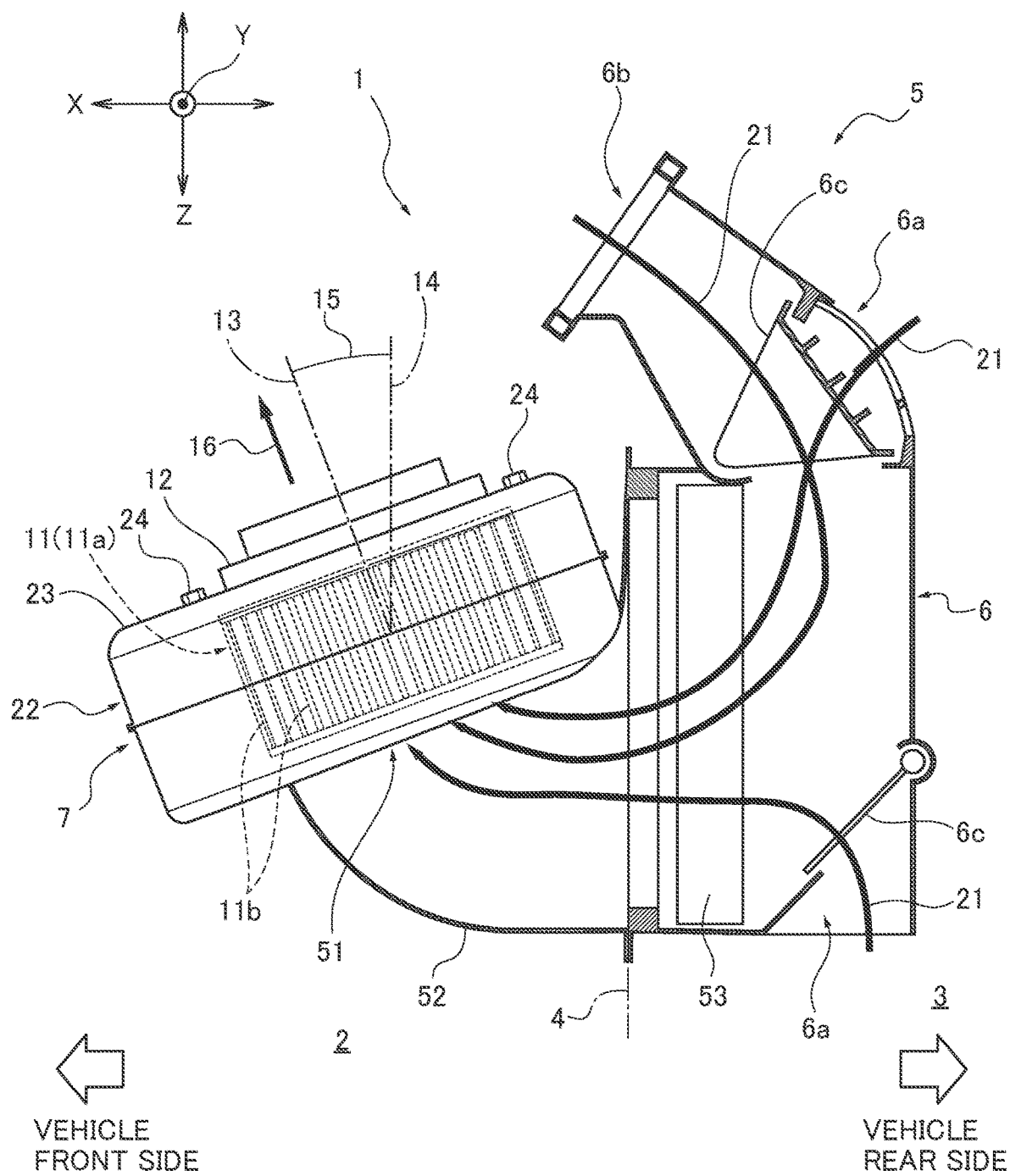
FIG. 4B is a vertical cross-sectional view illustrating the inside/outside air switching device and the blower (inclination angle: 20 degrees).

(2) Particularly, as shown in FIG. 4A to FIG. 4C, the inclination angle 15 of the rotating shaft 13 may be equal to or less than 45 degrees with respect to the vertical direction 14.

Here, 45 degrees is an angle that defines a boundary between an inclination state that the blower 7 is disposed close to the vertical arrangement (or vertical direction) and an inclination state that the blower 7 is disposed close to the horizontal arrangement (or horizontal direction). Arranging the rotating shaft 13 with the inclination angle 15 less than 45 degrees, the blower 7 becomes the inclination state closer to the horizontal arrangement (or horizontal direction).

More preferably, the inclination angle 15 of the rotating shaft 13 with respect to the vertical direction 14 may be set within a range between 20 degrees (FIG. 4B) and 40 degrees (FIG. 4C).

Figure 4D:
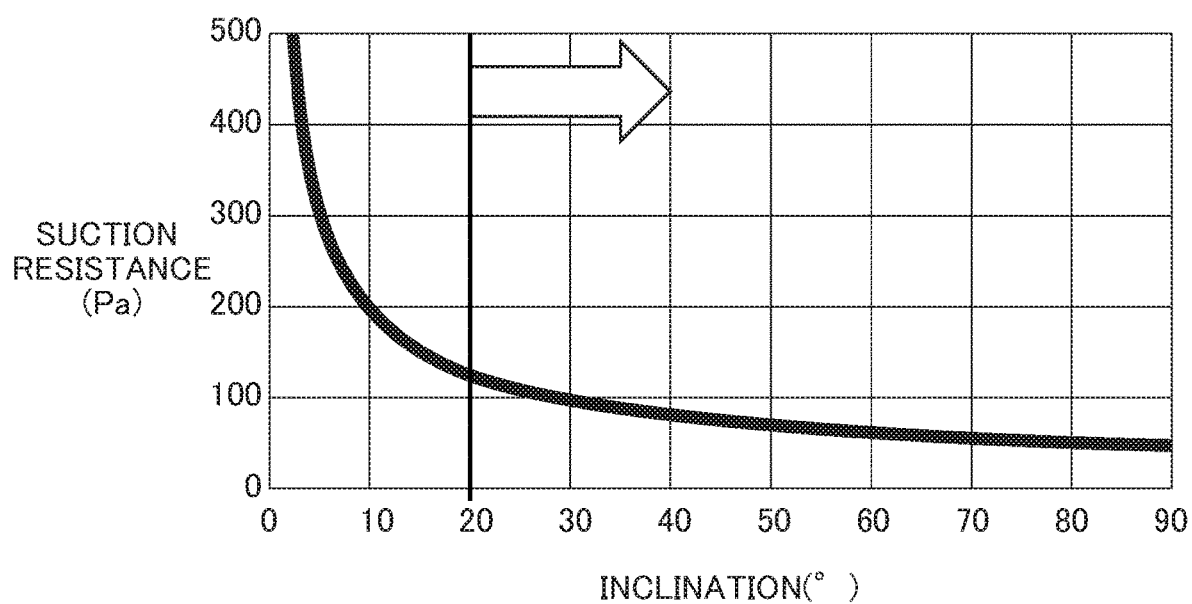
FIG. 4D is a graph showing relation between suction resistance of the blower and the inclination angle.

Here, 20 degrees is an angle in which the resistance (of filter 53 (FIG. 4A) or the like) in the suction side of the blower 7, that is suction resistance is reduced. FIG. 4D shows a graph summarizing the results of the study of the suction resistance. As can be seen from the figure, as the inclination angle 15 of the rotating shaft 13 becomes smaller than 20 degrees, the blower 7 becomes a state closer to the horizontal arrangement. As a result, the suction resistance is rapidly increasing. Therefore, it has been found that it is preferable to set the inclination angle 15 of the rotating shaft 13 greater than 20 degrees in order to reduce the suction resistance.

Also, the angles between 20 degrees and 40 degrees make it possible for a person such as a worker to look down the elements such as the motor 12 without difficulty while the person is standing for the maintenance or the like. Considering that the worker bends himself or herself forward to fasten the bolts to the fixing points 24 or the like when changing the motor 12, the inclination angle 15 of the rotating shaft 13 of the motor 12 is set equal to or less than 45 degrees, preferably to 20 degrees to 40 degrees with respect to the vertical direction so that it is expected that the working posture can be eased and the workability upon attaching and detaching the motor 12 can be sufficiently secured and improved.

Particularly, in this embodiment, the most preferable angle for the inclination angle 15 of the rotating shaft 13 is about 30 degrees (i.e. 30 degrees±5 degrees). In addition to the above, 30 degrees is, for example, the angle at which the influence of eccentricity generated on the rotating shaft 13 of the motor 12 and bearings (not shown) that support the rotating shaft 13 is relatively small. Also, 30 degrees is the angle at which eccentric load is unlikely to act on the sealing in the case that the sealing is provided between (opening of) the casing 22 of the blower 7 and the motor 12. Therefore, it is possible to minimize the burden on the blower 7 by setting the inclination angle 15 of the rotating shaft 13 to about 30 degrees (i.e. 30 degrees±5 degrees).

(3) As shown in FIGS. 2A, 2B, and FIG. 3A to FIG. 3C, a cover 31 that covers the blower 7 may be provided in the engine compartment 2. The cover 31 may include an opening and closing portion 32 in at least a portion of the upper side of the blower 7.

The cover 31 is provided to protect (shield) the blower 7 and the like from heat from the engine compartment 2. The cover 31 is also provided to prevent sound or noise from the blower 7 from leaking to the engine compartment 2 (to perform sound insulation). In addition, the cover 31 is provided to prevent foreign objects and rainwater from entering the blower 7, or to prevent damage caused by water from the road surface, flooding, etc., when driving on a rough road or a flooded road. Therefore, the cover 31 is formed of a member or material capable of heat insulation, sound insulation, and prevention of foreign object intrusion.

A single cover 31 or a plurality of covers 31, which is relatively small, may be provided to respectively cover a portion of the air conditioner 5 which is disposed within the engine compartment 2. Alternatively, a single cover 31, which is larger than the above smaller cover, may be provided to entirely cover the portion of the air conditioner 5 disposed within the engine compartment 2 at one time. In this embodiment, the cover 31 may have, for example, a box body with a shape and a size that make it possible to cover the blower 7 and the front portion 8a of the air conditioner body 8 at the same time.

The cover 31 may be attached to the vehicle body by using the partition wall 4. In this embodiment, the cover 31 includes a front surface, left and right side surfaces, and a bottom surface. A rear side of the cover 31 is attached to the partition wall 4 so as to be covered by the partition wall 4. An upper surface or upper end of the cover 31 includes an opening 31a to which the opening and closing portion 32 is attached.

The opening and closing portion 32 is a cap or lid that is attached to the upper end of the cover 31. It is sufficient for the opening and closing portion 32 to open and close at least the upper side of the blower 7. In this embodiment, the opening and closing portion 32 is configured to entirely open and close the upper end of the cover 31 so as to form the upper surface of the cover 31. Therefore, the opening 31a is substantially entirely formed on the upper end of the cover 31.

(4) As shown in FIG. 3C, an inclination portion 41 may be provided at least in a portion of the upper side of the cover 31 along the mounting surface 23 of the motor 12 in the blower 7.

The upper side of the cover 31 may include the opening and closing portion 32, or portions other than the opening and closing portion 32. In this embodiment, the opening 31a is formed substantially entirely on the upper end of the cover 31 and the opening and closing portion 32 is large enough to cover the opening 31a as described above. Accordingly, the upper side or upper surface of the cover 31 substantially consists of the opening and closing portion 32.

The mounting surface 23 of the motor 12 in the blower 7 constitutes the upper surface of the casing 22 of the blower 7. The upper surface of the casing 22 of the blower 7 is inclined forward and downward toward the front side of the vehicle 1 by the inclination of the rotating shaft 13. Accordingly, the inclined portion 41 includes a portion that inclines forward and downward to be parallel to at least the mounting surface 23 of the motor 12. In the case that the height of the inclined portion 41 becomes larger than necessary since the inclined portion 41, which is substantially parallel to the mounting surface 23 of the motor 12, is entirely provided in the upper side of the cover 31, the portion located above the upper surface of the casing 22 of the blower 7 may be formed as the inclined portion 41 and a portion other than that portion may be formed as a substantially horizontal surface or as an inclined surface close to the horizontal surface. It is preferable that the inclined surface close to the horizontal surface in the above case may incline forward and downward continuous with the inclined portion 41 so as to constitute a two-step inclined portion. Also, the side surfaces of the opening and closing portion 32 may be substantially vertical surfaces. Alternatively, the side surfaces of the opening and closing portion 32 may be inclined surfaces close to the vertical surfaces so that a distance between the surfaces at the upper ends thereof is wider than a distance between the surfaces at the bottom ends thereof and vice versa.

(5) As shown in FIG. 4A, the fan 11 may be a cylindrical sirocco fan 11a. An air intake portion 51 of the blower 7 may be provided in the bottom side of the rotating shaft 13. The inside/outside air switching device 6 may be provided upstream of the air intake portion 51 via an air passage 52. The filter 53 may be provided between the air intake portion 51 and the inside/outside air switching device 6.

The sirocco fan 11a is integrally configured, for example, by cylindrically arranging a plurality of vanes 11b. The rotating shaft 13 is provided (directly mounted) in the center position of the sirocco fan 11a. An attachment portion of the sirocco fan 11a relative to the rotating shaft 13 is formed in a concave shape so that the concave portion can accommodate at least a part of the motor 12. As a result, the sirocco fan 11a and the motor 12 can be compactly integrated.

In the case that the blower 7 includes the sirocco fan 11a, the air intake portion 51 is provided on an end opposite to the motor 12 in the axial direction of the sirocco fan 11a. The motor 12 is provided in the upper side of the sirocco fan 11a (or the casing 22) such that the air intake portion 51 faces downward.

On the other hand, as shown in FIG. 5C, the air intake portion 51 faces upward in the case that the motor 12 is provided in the bottom side of the casing 22 of the blower 7.

The air passage 52 is provided to supply the air 21 to be conditioned from the inside/outside air switching device 6 to the blower 7. The air passage 52 extends through an aperture 4a (see FIG. 1) provided in the partition wall 4, which partitions the engine compartment 2 and the vehicle cabin 3, to connect the inside/outside air switching device 6 and the air intake portion 51 of the blower 7.

The inside/outside air switching device 6 is a device for switching the inside and outside air. The inside/outside air switching device 6 includes an inside air intake portion 6a for circulating the air in the vehicle cabin 3 and an outside air intake portion 6b for taking in the outside air. The inside air intake portion 6a and the outside air intake portion 6b are provided with a switching door 6c that can be moved.

The filter 53 is detachably provided within the inside/outside air switching device 6. In this embodiment, the filter 53 is vertically disposed such as to be attachable to or detachable from the inside/outside air switching device 6 from the bottom side thereof.

The suction resistance of the filter 53 is substantially defined by an area of a portion through which the filter 53 can effectively pass the air 21 (shaded portion in filter 53 shown in FIGS. 5A to 5C, for example). This area is affected by the orientation of the air intake portion 51 and the flow path geometry of the air passage 52.

In this embodiment, the air 21 can pass through a wide area of the filter 53 since the inside/outside air switching device 6 and the blower 7 are separately provided in the vehicle cabin 3 and the engine compartment 2 respectively, and the air intake portion 51 is diagonally provided downward. This configuration is advantageous in reducing the suction resistance of the filter 53.

(6) As shown in FIG. 6A to FIG. 6D, the blower 7 may be inclined so that the vehicle front side of the blower 7 is lower and a discharge portion 61 of the blower 7 may be provided in the vehicle front side. In this case, an inlet 62 of the air conditioner body 8 provided downstream of the blower 7 is connected to the discharge portion 61 at the position in the vehicle front side.

The discharge portion 61 of the blower 7 is provided in a direction substantially tangential to the casing 22 of the blower 7 from the position in the vehicle front side where the casing 22 is the lowest due to the inclination. The air conditioner body 8 here means the front portion 8a disposed within the engine compartment. The blower 7 is disposed in the engine compartment 2 located in the vehicle front side, and the air 21 is supplied from the blower 7 to the vehicle cabin 3 located in the rear of the engine compartment 2. Thereby, the air in the air conditioner body 8 substantially flows rearward from the vehicle front side. Accordingly, the inlet 62 (for the air 21) of the air conditioner body 8 is provided on the side end in the side of the blower 7 in the front portion 8a of the air conditioner body 8.

The blower 7 is inclined so that the vehicle front side of the blower 7 is lower and the discharge portion 61 of the blower 7 is provided at the position in the vehicle front side that is lower. This makes it easy to adjust the positional relationship between the blower 7 and the air conditioner body 8 in the vehicle longitudinal direction X and the up-down direction Z. As a result, the blower 7 and the air conditioner body 8 are brought close to each other in a contact state or an adjacent state close to the contact state, so that the discharge portion 61 and the inlet 62 can be connected each other shorter and more linearly.

<Operation> Hereinafter, the operation of the embodiment will be described.

Operating the blower 7 in the air conditioner 5, the air 21 to be conditioned is taken in through the inside/outside air switching device 6 and then the taken air 21 is supplied to the air conditioner body 8 via the blower 7. The air conditioner body 8 adjusts the temperature of the air 21 from the blower 7 and then blows it into the vehicle cabin 3. Thereby, the temperature in the vehicle cabin 3 is adjusted.

At this time, the inside/outside air switching device 6 can be selected to circulate the air in the vehicle cabin 3 or to take in the outside air. In addition, the air conditioner body 8 is configured to cool and dehumidify the air 21, and then to heat the air 21 as necessary to adjust the air 21 to an optimum temperature.

<Effects> According to this embodiment, following effects can be achieved.

(Effect 1) In the air conditioner 5 in which the blower 7 is disposed within the engine compartment 2, the rotating shaft 13 of the motor 12 is diagonally arranged with the inclination angle 15 with respect to the vertical direction 14. Thereby, even with the air conditioner 5 mounted on the vehicle body, the blower 7 can be accessed with a simple procedure, and the attachment and detachment of the motor 12 can be performed from the upper side thereof. Therefore, it is possible to reduce the maintenance of the motor 12 and the incidental work during maintenance, shorten the work time and reduce the workload during the maintenance.

Moreover, in the case that the blower 7 and the air conditioner body 8 are arranged side by side in the vehicle width direction Y, for example, the rotating shaft 13 of the motor 12 is diagonally arranged with the inclination angle 15 that is greater than 0 degree and less than 90 degrees with respect to the vertical direction 14. Thereby, the step between the discharge portion 61 of the blower 7 and the inlet 62 of the air conditioner body 8 (due to differences in aspect ratio or the like) can be reduced so that the discharge portion 61 of the blower 7 and the inlet 62 of the air conditioner body 8 can be placed closer to each other. Therefore, it is possible to improve the ventilation resistance.

(Effect 2) Preferably, the inclination angle 15 of the rotating shaft 13 may be set to equal to or less than 45 degrees. Thereby, the inclination of the motor 12 becomes smaller and accordingly the motor 12 is inclined with the horizontal arrangement that is closer to the horizontal state. This facilitates the attachment and detachment of the motor 12 from the upper side thereof in addition to the above effect.

More preferably, the inclination angle 15 of the rotating shaft 13 with respect to the vertical direction 14 may be within a range between 20 degrees and 40 degrees. Thereby, the increase in the suction resistance of the blower 7 can be prevented so that the suction resistance can be kept lower. Further, the working posture of the worker or the like can be eased and the workability at the time of attaching and detaching the motor 12 can be improved.

More preferably, the inclination angle 15 of the rotating shaft 13 may be set to about 30 degrees (i.e. 30 degrees±5 degrees) or less than about 30 degrees. Thereby, vibration and noise caused by the eccentricity of the rotating shaft 13 can be suppressed; the cost of the bearings can be reduced; and the life of the sealing can be extended. Accordingly, the rotating shaft 13 can be effectively inclined while minimizing the burden on the blower 7. As a result, the more preferable inclination state can be achieved.

(Effect 3) The blower 7 may be covered by the cover 31. Thereby, the cover 31 can provide heat insulation and sound insulation in the engine compartment 2, and prevent foreign objects from entering the engine compartment 2. Even with the cover 31, the opening and closing portion 32 provided in the cover 31 can be opened and closed, so that the attachment and detachment of the motor 12 relative to the blower 7 can be performed from the upper side thereof.

(Effect 4) The inclined portion 41 may be provided at least in a portion of the upper side of the cover 31. This can prevent rainwater and other water from remaining on the upper side of the cover 31. Clearance between the motor 12 and the upper side of the cover 31 (e.g. opening and closing portion 32) can be secured by inclining the motor 12 with the inclination angle 15 closer to the horizontal state. Accordingly, the motor 12 can be arranged advantageously with respect to the up-down direction Z and it is easy to provide the inclined portion 41 on the upper side of the cover 31. In particular, inclining the inclined portion 41 downward to the front side of the vehicle 1 can prevent rainwater and other water from flowing into the vehicle cabin 3.

(Effect 5) The air intake portion 51 of the blower 7 may be provided in the bottom side of the rotating shaft 13 (i.e. opposite to the upper side of the rotating shaft 13 in which the motor 12 is attached) and the inside/outside air switching device 6 may be placed upstream of the air intake portion 51 via the air passage 52. Thereby, rainwater and the like can be prevented from flowing into the blower 7 through the air intake portion 51.

Further, in the case that the air intake portion 51 of the blower 7 is provided in the bottom side of the rotating shaft 13 and the filter 53 is disposed between the air intake portion 51 of the blower 7 and the inside/outside air switching device 6, when the rotating shaft 13 of the motor 12 is diagonally arranged with the inclination angle 15 that is greater than 0 degree and less than 90 degrees with respect to the vertical direction 14, the angle between the filter 53, which is usually provided vertically, and the air intake portion 51 of the blower 7 becomes smaller than 90 degrees. Therefore, the suction resistance of the filter 53 can be reduced compared to the state shown in FIG. 5B in which the rotating shaft 13 of the motor 12 is arranged in the horizontal direction and the state shown in FIG. 5C in which the motor 12 is attached to the bottom side of the blower 7 with the rotating shaft 13 inclined.

(Effect 6) The blower 7 may be inclined so that the vehicle front side of the blower 7 is lower and the discharge portion 61 of the blower 7 may be provided in the vehicle front side. Thereby, the discharge portion 61 of the blower 7 and the inlet 62 of the air conditioner body 8 can be connected shorter and more linearly, so that the ventilation resistance between the blower 7 and the air conditioner body 8 can be reduced.

Figure 7A:
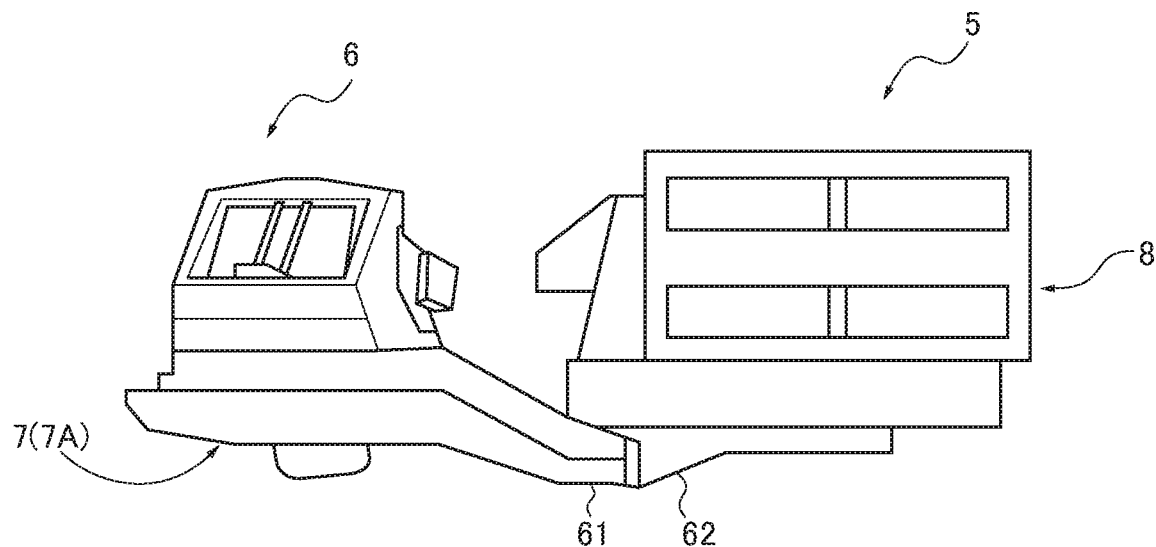
FIG. 7A is a plan view illustrating a comparative example relative to FIG. 6A.
Figure 7B:
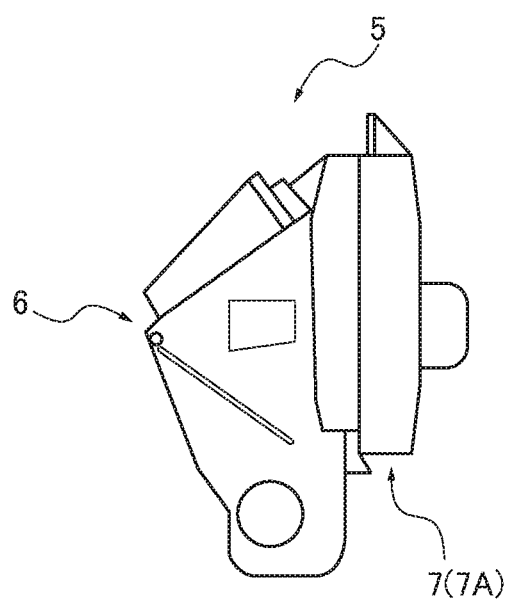
FIG. 7B is a side view illustrating the comparative example shown in FIG. 7A.
Figure 7C:
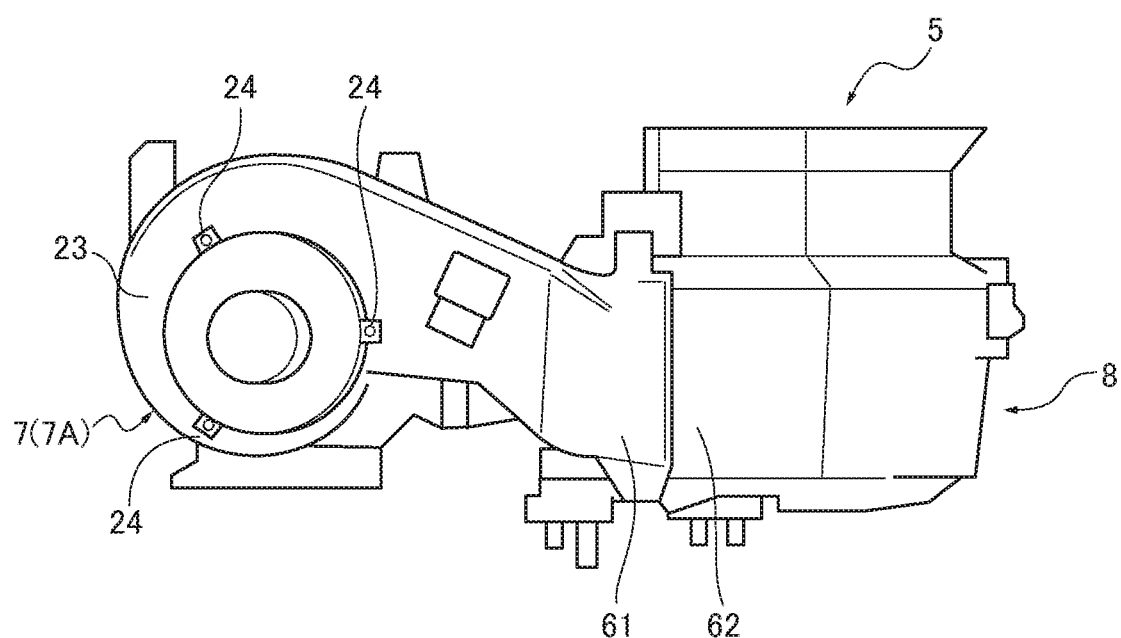
FIG. 7C is a front view illustrating the comparative example shown in FIG. 7A.

On the other hand, in the comparison examples shown in FIG. 7A to FIG. 7C where the blower 7 (blower 7A) is vertically arranged, for example, the positional relationship between the blower 7 and the air conditioner body 8 is largely deviated in the vehicle longitudinal direction X and the up-down direction Z. Accordingly, in order to mitigate the influence of the deviation, it is necessary to largely separate the blower 7 and the air conditioner body 8 to elongate the discharge portion 61 of the blower 7, to increase the diameter of the discharge portion 61 or bend the discharge portion 61 to fit the inlet 62 of the air conditioner body 8. As a result, it is difficult to prevent the ventilation resistance between the blower 7 and the air conditioner body 8 from increasing.

In this embodiment, the blower 7 is inclined so that the vehicle front side of the blower 7 is lower and the discharge portion 61 of the blower 7 is provided in the lower vehicle front side. Thereby, the deviation of the positional relationship between the blower 7 and the air conditioner body 8 in the vehicle longitudinal direction X and the up-down direction Z can be minimized. Therefore, it is unnecessary to separate the blower 7 and the air conditioner body 8, to increase the diameter of the discharge portion 61 or bend the discharge portion 61 in order to fit the inlet 62 of the air conditioner body 8. As a result, the discharge portion 61 of the blower 7 and the inlet 62 can be connected shorter and linearly. Therefore, the ventilation resistance between the blower 7 and the air conditioner body 8 can be reduced.

What is claimed is:

1. A vehicle air conditioner comprising:
 a blower being disposed within an engine compartment of a vehicle,
 wherein the blower comprises a motor, the motor being configured to rotate an impeller of the blower,
 wherein the motor is attachable and detachable to the blower at the engine compartment, and an attachable/detachable direction of the motor with respect to the blower is upward and downward along a rotating shaft of the motor at the engine compartment, and
 wherein the rotating shaft of the motor extends in the attachable/detachable direction of the motor and is diagonally arranged with an inclination angle that is greater than 0 degree and less than 90 degrees with respect to a vertically upward direction of the vehicle, the rotating shaft inclining toward a front side of the vehicle along the attachable/detachable direction of the motor within the engine compartment,
 wherein the motor is provided on an upper side of the impeller and the motor is detachable above the blower and upward and forward of the vehicle within the engine compartment.

2. The vehicle air conditioner according to claim 1, wherein the inclination angle of the rotating shaft with respect to the vertical direction is equal to or less than 45 degrees.

3. The vehicle air conditioner according to claim 1, wherein the inclination angle of the rotating shaft is within a range between 20 degrees and 40 degrees with respect to the vertical direction.

4. The vehicle air conditioner according to claim 1,
 wherein a cover is disposed in the engine compartment to cover the blower, and
 wherein the cover includes a cap or lid configured to open or close, the cap or lid located at an upper side of the blower.

5. The vehicle air conditioner according to claim 4, wherein an inclination portion is provided at least in a portion of an upper side of the cover along a mounting surface of the motor in the blower.

6. The vehicle air conditioner according to claim 1,
 wherein the blower is a cylindrical sirocco fan,
 wherein an air intake portion of the blower is provided in a bottom side of the rotating shaft,
 wherein an inside/outside air switching device is provided upstream of the air intake portion via an air passage, and
 wherein a filter is provided between the air intake portion and the inside/outside air switching device.

7. The vehicle air conditioner according to claim 1,
 wherein the blower is disposed to be inclined so that a vehicle front side of an upper surface of the blower is lower than a vehicle rear side of the upper surface of the blower, and
 wherein a discharge portion of the blower is provided in the vehicle front side.

* * * * *